United States Patent [19]  [11] 3,843,269
Hohberg  [45] Oct. 22, 1974

[54] PROCESS AND APPARATUS FOR PHOTOMETRIC DETERMINATION OF THE EXTINCTION OF A SAMPLE

[75] Inventor: Gerhard Hohberg, Hackenheim, Germany

[73] Assignee: Carl Zeiss Stiftung, (Heidenheim on the Brenz), Wurttemberg, Germany

[22] Filed: Nov. 19, 1973

[21] Appl. No.: 417,412

[30] Foreign Application Priority Data
Nov. 27, 1972 Germany.......................... 2258094

[52] U.S. Cl................ 356/205, 250/564, 250/576, 356/246
[51] Int. Cl......................... G01n 21/24, G01n 1/10
[58] Field of Search .......... 250/564, 565, 343, 576; 356/205, 246; 235/151.3

[56] References Cited
UNITED STATES PATENTS
2,806,957 9/1957 McDonald ........................ 356/246
3,578,865 5/1971 Traver ................................ 356/246
3,619,624 11/1971 Sorenson ........................... 356/103

FOREIGN PATENTS OR APPLICATIONS
492,978 5/1974 Switzerland

Primary Examiner—James W. Lawrence
Assistant Examiner—T. N. Grigsby
Attorney, Agent, or Firm—Stonebraker & Shepard

[57] ABSTRACT

A process and apparatus for photometric determination of the extinction of a sample with a photoelectric measuring instrument. The radiation to be measured strikes the photoelectric receiver only on a path through the measurement cell. The thickness of the sample is modulated periodically, to produce in the receiver current an alternating current portion and a direct current portion. The alternating current portion of the signal is divided by the direct current portion by means of a quotient computer, thus giving a value which is directly proportional to the extinction sought.

10 Claims, 5 Drawing Figures

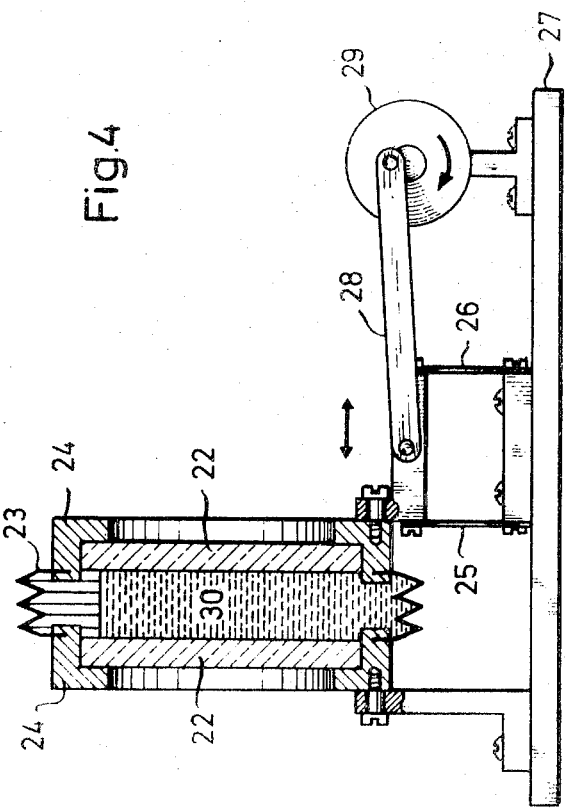

PROCESS AND APPARATUS FOR PHOTOMETRIC DETERMINATION OF THE EXTINCTION OF A SAMPLE

BACKGROUND OF THE INVENTION

The present invention relates to a process and an apparatus for the photometric determination of the extinction of a sample with a photoelectric measuring instrument in which the radiation to be measured strikes the photoelectric receiver only on the path through the measurement cell.

In order to determine the extinction of a sample, one generally proceeds by radiating the sample with monochromatic light of different wavelengths and measuring the transmission T of the sample in percent by means of a photoelectric measuring instrument. The extinction E at the wavelength in question is then calculated in accordance with the formula:

$$E = \log 100/T$$

This process is relatively cumbersome since a special calculation is necessary and the spectral course of the extinction is recognizable only after the recording of the values in a graph.

Methods have therefore been sought for effecting the evaluation in accordance with the above-indicated formula by machine. These tasks are handled in a particularly elegant fashion by so-called transmission-concentration computers which effect the conversion electronically and the result of the measurement of which can also be recorded as a curve on a recorder. This method, however, has the disadvantage that a relatively high electronic expense is necessary.

Another disadvantage of the known methods for determining extinction is that a comparison measurement establishing the 100 percent point of the transmission scale is necessary in each case. In the so-called irradiation method, a cup containing a blind solution is first of all brought into the path of the ray and the 100 percent point thereby adjusted. After removal of this cup, the actual measurement cup is brought into the path of the ray and the transmission is measured directly. The 100 percent point must be frequently checked, i.e., the measurement cup is then to be replaced by the cup containing the blind solution. This method is cumbersome and can result in errors if the two cups are not precisely adapted to each other and if variations in the intensity of the source of light occur during the actual measurement.

In order to eliminate these defects, it is possible, in accordance with one known proposal, to use only a single cup into which there dips a ligh-permeable body which in a first position displaces the measurement solution as completely as possible out of the path of the measurement beam and in a second position releases a given layer thickness of the measurement solution for the passage of the measurement radiation. In the first position of the immersion body, the 100 percent point of the measurement instrument is adjusted. If the immersion body is now moved into its second position, the resultant indication of the measurement instrument is proportional to the transmission of the sample which is sought.

Both measurement methods have the feature in common that the extinction must be calculated separately and that the measurement can be falsified, for instance by variations of the intensity of the lamp.

The object of the present invention is to provide a method for the photometric determination of the extinction of a sample which, without any great expense, makes possible the direct measurement of the extinction and in which the measured values are independent of external influences, for instance variations in the intensity of the light.

BRIEF DESCRIPTION OF THE DRAWINGS

FIG. 4 is a schematic view, partly in side elevation and partly in vertical section, showing a bellows cup with a periodically movable wall part.

DESCRIPTION OF THE PREFERRED EMBODIMENT

Figure 1:
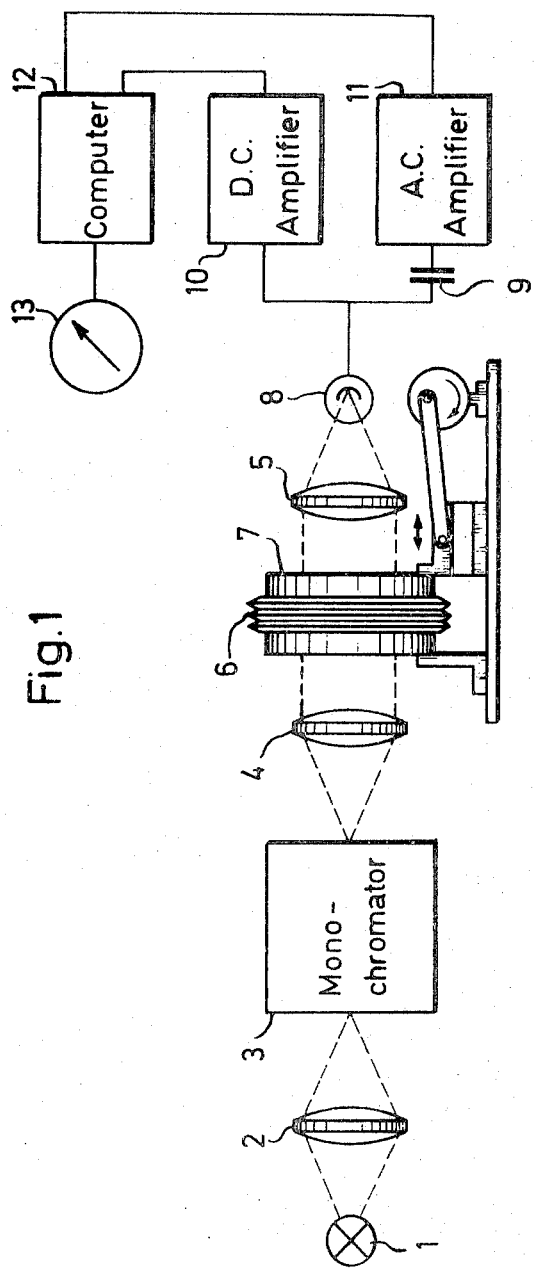
FIG. 1 is a schematic illustration, partly in side elevation and partly in block diagram form, illustrating apparatus according to one embodiment of the invention.

The method of the invention operates with a measurement instrument in which the measurement radiation strikes the photoelectric receiver only on the path through the measurement cell. It is characterized by the fact that the length of path of the radiation passing through the sample is changed by a small amount periodically with the frequency $\omega$, that the direct current portion of the resultant measurement signal and its alternating current portion of the frequency $\omega$ are separated out, and that the quotient of these separated signal portions is formed and indicated.

The dividing of the a.c. signal by the d.c. signal is advisedly effected in a known quotient computer. Such a computer can operate, for instance, in the manner that the d.c. signal is constantly reset to the same constant value, the degree of amplification of the a.c. amplifier being simultaneously adjusted in such a manner that a measurement instrument fed with the resultant a.c. signal directly indicates the extinction. The expense necessary for this is considerably less than the expense for a transmission-concentration computer.

It is particularly advantageous to effect the change in the path length of the radiation passing through the sample by periodic variation of the thickness of layer of the sample.

If the layer thickness is modulated periodically, then, in addition to a receiver current: $I = I_o \cdot e^{-m\bar{s}}$ which corresponds to the mean layer thickness $\bar{s}$ of the sample ($m$ = constant proportional to the extinction), there can also be measured the dividing of the receiver current with respect to the path length:

$$dI/ds = -m \cdot I_o \cdot e^{-ms} = -m \cdot I$$

The receiver current $I$ represents a d.c. portion, while the value $dI/ds$ is an a.c. portion whose frequency corresponds to the frequency of the modulation of the layer thickness.

If the a.c. portion of the signal is divided by the d.c. portion, we have:

$$dI/ds / I = -m$$

i.e. a value which is directly proportional to the extinction sought.

With a sinusoidal modulation of the layer thickness s with the frequency ω, the a.c. portion of the signal, it is true, is only approximately proportional to the derivative dI/ds. However, if the change in layer thickness Δs is so limited that $|m \cdot \Delta s| < 0.25$, i.e. if a maximum change of transmission of ± 20 percent is permitted, then the maximum deviation from linearity remains less than 1 percent. If the layer thickness is modulated with a rectangular function rather than with a sine function, then, for the same accuracy, a change in transmission of ± 15 percent is permissible.

In addition to the advantage that the extinction of the sample can be directly indicated and recorded, there is the substantial advantage in the new method that by the formation of the quotient, external disturbing influences are compensated for, i.e., that the constancy over a long period of time of the new measurement method is just as great as that of the known two-beam methods.

The modulation of the thickness of the layer of the sample can be carried out in various ways. Thus in the case of liquid or gaseous samples, a continuous or stepped wedge can be immersed into the cup and moved periodically perpendicular to the direction of the radiation. It is also possible to use a bellows cup which has at least one wall part which can be periodically moved in the direction of the radiation. Another possibility is to have two light pipes dip into the cup for the feeding and removal of the radiation, at least one of them being periodically movable so as to change the distance between them.

Solid as well as liquid and gaseous samples permit a determination of the extinction by the method of the invention if the sample has the shape of a continuous or stepped wedge and the radiation which is passed through the sample is deflected by optical-mechanical means, for instance a swivel mirror or rotary wedges, periodically over different paths through the sample. By further swivel mirrors or rotary wedges or by a reflection prism, the deflection of the radiation can be compensated for again behind the sample.

The invention will be described in further detail below with reference to the accompanying drawings which show various embodiments by way of example of devices for the carrying out of the new method.

In FIG. 1, 1 is a source of light which, via a lens 2, illuminates the entrance slot of a monochromator 3. The monochromatic light proceeding from the exit slot of the monochromator is conducted via lenses 4 and 5 through the bellows cup 6 whose wall part 7 is periodically movable. In the bellows cup, which will be described further below, which contains the sample to be measured, the layer thickness is periodically modulated with the frequency ω by the movement of the wall part 7. The light passing through the sample passes via the lens 5 onto the photoelectric receiver 8.

The electric signal given off by the receiver 8 is broken down by means of the condenser 9 into a d.c. portion and an a.c. portion of the frequency ω which are amplified separately in the d.c. amplifier 10 and the a.c. amplifier 11. Both the d.c. signal and the a.c. signal are fed to the quotient computer 12 which supplies an output signal which corresponds to the ratio of the a.c. signal to the d.c. signal. The connected measuring instrument or meter 13 then indicates a measured value which is proportional to the extinction of the sample.

Figure 2:
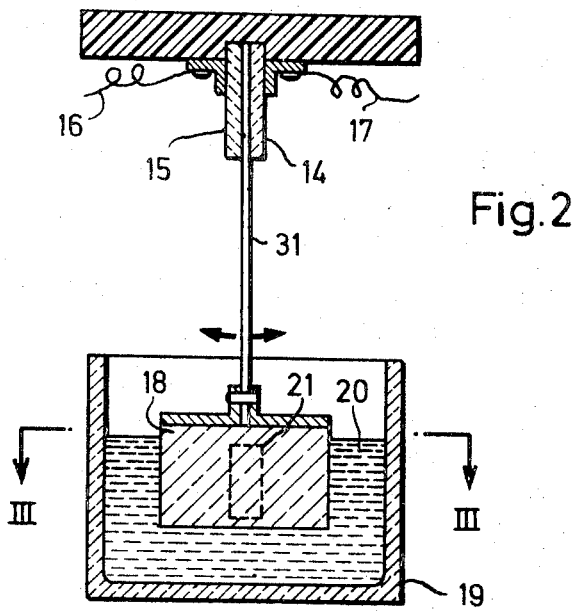
FIG. 2 is a schematic view of apparatus for periodic modulation of a light path in a cup, partly in the form of a section taken approximately on the section line II—II of FIG. 3a and FIG. 3b.
Figure 3A:
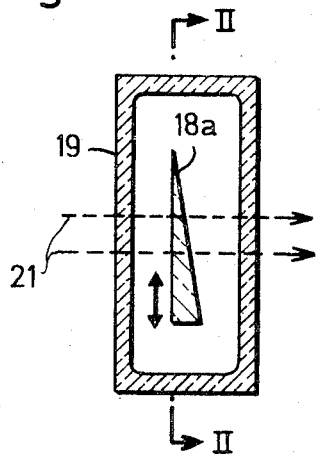
FIG. 3a is a horizontal section taken approximately on the line III—III of FIG. 2, illustrating one form of swivel wedge.
Figure 3B:
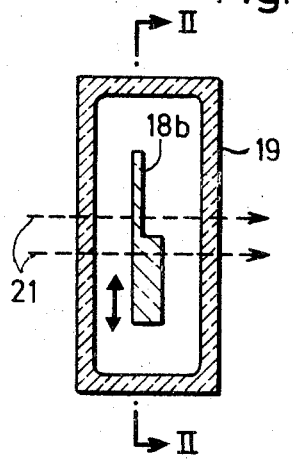
FIG. 3b is a view similar to FIG. 3a illustrating a different form of the wedge.

The apparatus shown in FIG. 2 shows a piezoelectric ceramic 14, 15 which is excited to flexural oscillations by the applying of an alternating voltage to the terminals 16 and 17. These oscillations are transmitted to the spring plate 31 which bears at its end a wedge plate 18 which is permeable to radiation. The wedge plate dips into the cup 19 containing the sample liquid 20 and is passed through at the point 21 by the measurement beam. The two FIGS. 3a and 3b show a top view of the wedge plate 18 on the one hand in continuous type 18a and in the other case in step type 18b. In both cases, a modulation of the thickness of layer of the sample is obtained by the swinging of the wedge plate in the direction indicated by the arrows.

The construction of a bellows cup can be noted from the diagrammatic showing of FIG. 4. The drawing shows the cup windows 22 which are embedded in the frame halves 24 which are connected with each other by the bellows 23 of elastic material. The right hand frame is attached via spring plates 25, 26 with the base plate 27 and moved back and forth by the eccentric drive 28, 29. By the periodic movement of the right hand cup window, the modulation of the thickness of the layer of a sample of liquid 30 present in the cup is effected.

What is claimed is:

1. Process for the photometric determination of the extinction of a sample with a photoelectric measuring instrument in which the measurement radiation strikes the photoelectric receiver only over a path through a measurement cell, characterized by the fact that the length of path of the radiation passing through the sample is changed by a small amount periodically with the frequency ω, that an a.c. portion of the frequency ω of the resultant measurement signal and a d.c. portion thereof are separated, and that the quotient of the separated signal portions is formed and indicated.

2. Process according to claim 1, characterized by the fact that the division of the a.c. signal by the d.c. signal is effected automatically in a known quotient computer.

3. Process according to claim 1, characterized by the fact that the change in the length of path of the radiation which passes through the sample is effected by periodic change of the thickness of layer of the sample.

4. Apparatus for photometric determination of the extinction of a sample with a photoelectric measuring instrument, comprising means for holding a sample, means for projecting radiation along a path passing through a sample in said holding means, a photoelectric receiver positioned to receive only radiation which has passed through said sample, means for changing the length of path of the radiation passing through the sample by a small amount periodically with the frequency ω, means for separating an a.c. portion of the frequency ω of a resultant measurement signal from a d.c. portion thereof, and means for forming and indicating a quotient resulting from dividing said a.c. portion by said d.c. portion.

5. Apparatus according to claim 4, characterized by the fact that a radiation-permeable wedge is contained in a liquid or gaseous sample and is moved periodically perpendicular to the direction of radiation.

6. Apparatus according to claim 5, wherein said wedge is a wedge of continuously varying thickness.

7. Apparatus according to claim 5, wherein said wedge is a wedge of stepped form.

8. Apparatus according to claim 4, characterized by the fact that said holding means is in the form of a bellows cup which has at least one radiation-permeable wall portion which is periodically movable in the direction of travel of the radiation.

9. Apparatus according to claim 4, characterized by the fact that two light pipes dip into a liquid or gaseous sample, at least one of them being periodically movable so as to change the distance between them.

10. Apparatus according to claim 4, characterized by the fact that the sample or a cup in which the sample is contained has the shape of a continuous or stepped wedge, and that the radiation passing through the sample is so deflected by optical-mechanical means that the path of radiation within the sample is periodically changed.

* * * * *